Patented June 14, 1949

2,473,341

UNITED STATES PATENT OFFICE 2,473,341

UNSATURATED HALOGEN-CONTAINING NITRO COMPOUNDS AND THEIR PRODUCTION

Eduard Cornelis Kooijman and Johan Overhoff, Amsterdam, Netherlands, assignors to Shell Development Company, San Francisco, Calif., a corporation of Delaware No Drawing. Application April 7, 1947, Serial No. 739,948. In the Netherlands July 5, 1946

14 Claims. (Cl. 260—644)

This invention relates to the production of new and useful unsaturated halogen-containing nitro-compounds, and more specifically relates to the nitration of halogen-containing olefinic compounds, and to the halo-nitro-olefinic compounds thereby produced.

According to the process of the present invention, olefinic halogen compounds of the general formula:

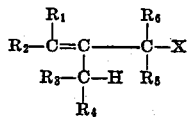

wherein $R_1$, $R_2$, $R_3$, $R_4$, $R_5$ and $R_6$ represent hydrogen atoms, hydrocarbon radicals, or halo-substituted hydrocarbon radicals, such as alkyl, aralkyl, alkaryl, aryl, or cyclic paraffinic radicals, or their halo-substitution products, and wherein X represents a halogen atom, are subjected to the action of nitrous acid, or nitrogen oxides, under conditions hereinafter described, to produce new and useful compounds. The reactants of the present invention, therefore, are olefinic halides wherein the olefinic linkage is in the beta, gamma position with respect to the halogen atom, and the beta carbon atom is an unsaturated tertiary carbon atom. In view of the diminution in the chemical reactivity of olefinic linkages caused by a multiplicity of carbon atoms, reactants containing not more than about 16 carbon atoms, which are open chain monoolefinic halohydrocarbons containing the structural grouping,

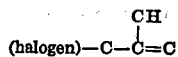

comprise the most suitable class of olefinic halide reactants for employment in the process of the invention. It is essential that the structure and composition of the reactants employed in the process of our invention be within these limitations. We prefer to employ a reactant wherein the unsaturated gamma carbon atom, as above defined, is the carbon atom of a terminal methylene group, and wherein the halogen atom is a chlorine or bromine atom, since, as we have found, excellent results are achieved therewith, i. e., relatively high yields and rates of production are obtained therewith, and the products obtained are especially advantageous for a variety of uses. In the above structural formula, suitable alkyl radicals which $R_1$, $R_2$, $R_3$, $R_4$, $R_5$ and $R_6$ may represent are, for example, the methyl, ethyl, n-propyl, isopropyl, the butyl, and the amyl radicals; suitable aralkyl radicals are, for example, the benzyl, methyl benzyl, phenyl ethyl, phenyl propyl, and naphthyl methyl radicals; suitable alkaryl radicals are, for example, the methyl phenyl, ethyl phenyl, propyl phenyl, methyl naphthyl and ethyl naphthyl radicals; suitable aryl radicals, for example, are the phenyl and naphthyl radicals; and suitable representative cycloparaffinic or cycloaliphatic hydrocarbon radicals are the cyclopentyl, methyl cyclopentyl, dimethyl cyclopentyl, ethyl cyclopentyl, cyclohexyl, methyl cyclohexyl, polymethyl cyclohexyl, and propyl cyclohexyl radicals. Representative halogen-substituted hydrocarbon radicals which $R_1$, $R_2$, $R_3$, $R_4$, $R_5$ and $R_6$ may represent are the chloromethyl, dichloromethyl, chloroethyl, bromomethyl, bromoethyl, chloropropyl, chlorobutyl, iodoethyl, fluoromethyl, chlorobenzyl, chlorophenyl, dichlorophenyl, chloronaphthyl, chlorocyclopentyl, bromocyclopentyl, chlorocyclohexyl, chloromethyl cyclopentyl and bromomethylcyclohexyl radicals.

The new compounds of the present invention may be represented by the general formula:

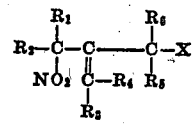

wherein $R_1$, $R_2$, $R_3$, $R_4$, $R_5$, $R_6$ and X represent the same atoms or radicals as above described. Thus, the new compounds prepared according to the process of the present invention are nitro-halo-olefinic compounds wherein the olefinic linkage is in beta, gamma relation to both the nitro group and the halogen atom, which nitro group and halogen atom are attached to different carbon atoms, and therefore each of the said different carbon atoms are attached to the same unsaturated tertiary carbon atom. The compounds conforming in structure and composition to this definition have not been known heretofore.

The above described compounds may be employed for a wide variety of applications of industrial and commercial importance. Thus, for example, such compounds may be employed and are surprisingly effective as fumigants against many harmful insects, as selective extracting agents for a variety of substances, as solvents, for example, of cellulose derivatives, in dye compositions, in the preparation of pharmaceuticals, in varnish, dope and lacquer compositions, in detergent compositions, as emulsifiers, as intermediates in the preparation of valuable derivatives, and the like.

As above described, the new compounds of the present invention are prepared by reacting a halogen-containing olefinic compound, as above defined, with nitrous acid or a nitrogen oxide or mixture of oxides. The preferred process contemplates performing the reaction in an aqueous medium, for example, by dissolving or dispersing the olefinic reactant in an aqueous solution of a mineral acid, and adding thereto an aqueous solution of an alkali or alkaline earth metal nitrite. The reaction between the nitrite and acid produces nitrous acid directly in the reaction mixture, which then reacts with, or which dissociates into nitrogen oxides which react with the dissolved or dispersed olefinic compound. Various mineral acids which react with the nitrites to produce nitrous acid may be employed, sulfuric acid giving excellent results, as do phosphoric and nitric acids. The halogen acids such as hydrochloric, however, are less suitable, since they may undergo side reactions with the olefinic reactant resulting in the formation of undesired additive compounds. Various modifications in the preferred process may be made, e. g., the alkali or alkaline earth metal nitrites may be added to the acidified aqueous reaction mixture in solid form, preferably pulverized in order to achieve rapid reaction.

In carrying out a preferred embodiment of the process of the invention, an olefinic compound of the general formula:

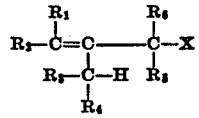

wherein $R_1$, $R_2$, $R_3$, $R_4$, $R_5$ and $R_6$ represent hydrogen atoms, hydrocarbon radicals or halo-substituted hydrocarbon radicals, such as alkyl, aralkyl, alkaryl, aryl or cyclic paraffinic groups, or their halo-substitution products, and wherein X represents a halogen atom, and preferably wherein $R_1$ and $R_2$ are hydrogen atoms and X is a chlorine or bromine atom, may be dissolved or dispersed in an aqueous solution of sulfuric acid. To this solution may be added an aqueous solution of an alkali or alkaline earth metal nitrite. The preferred reaction temperature is from about 25 to 60° C., though lower temperatures, e. g., 0° C., and higher temperatures, e. g., 100° C. may be used. Temperatures of above about 100° C., however, should be avoided, since undesirable side reactions may occur at such elevated temperatures. The unsaturated nitro-halo-olefinic products may be separated from the reaction mixture by any convenient means, as for example, by fractional distillation. We have found, however, that during distillation a considerable quantity of gases may be released from the reaction mixture, especially where the nitrite addition was performed at relatively low temperatures, which may interfere with the distillation process. This difficulty may be overcome by heating the reaction mixture, before distillation, to about boiling temperature preferably with a quantity of an inert solvent, such as toluene.

In carrying out the process of our invention a blue color is formed in the reaction mixture soon after the addition of nitrite, which increases in intensity with continued addition of nitrite. At relatively high reaction temperatures, about 60° C., the blue color rapidly changes to green. We have further observed, as above described, that in the recovery of our products by fractional distillation, there may be generated during the distillation a considerable quantity of gas which may interfere with said distillation. This evolution of gas is especially evident when the nitrite addition was performed at relatively low temperatures, e. g., below about 40° C. Though we do not wish to be limited by any theoretical explanation, we believe these phenomena are due at least in part to the formation of an addition product or products between the olefin and the oxides of nitrogen, probably nitrogen trioxide, which are probably formed from the generated nitrous acid. Part of the attached nitrogen oxides are split off by the elevated temperature encountered during the reaction or the distillation, thereby causing the color change and gas generation.

As illustrative of a specific example of a preferred embodiment of the process of the present invention, from about 1 to 6 mols of methallylchloride (2-chloromethylpropene-1) is dissolved or dispersed in an aqueous solution of sulfuric acid comprising from about 50 to 150 mols of water and from about 1 to 10 molts of sulfuric acid. A quantity of an aqueous solution of sodium nitrite, comprising about 1 part of nitrite to from about 1 to 10 parts of water, preferably sufficient to generate an excess of nitrous acid, is slowly added, the temperature being held to from about 25 to 60° C. The reaction products are washed with water, mixed with about double their volume of toluene, and heated to boiling temperature. At the end of gas generation the toluene and unreacted methallyl chloride are removed by vacuum distillation and the desired products recovered by vacuum fractional distillation. If desired, the product may be further purified, for example by treatment with aqueous alkali, acidification and ether extraction. The chief product obtained is 2-chloromethyl-3-nitropropene-1.

In a substantially identical manner, other halogen containing olefinic compounds of the above defined class may be treated to produce new and useful products. For example, the following compounds may be treated in accordance with the process of our invention to produce unsaturated nitro compounds conforming to the above definition: 2-bromomethylpropene-1; 3-chloro-2-methylbutene-1; 3-chloro-2,3-dimethylbutene-1; 3-chloro-2-methylpentene-1; 3-chloro-2-methylhexene-1; 3-chloro-2-ethylbutene-1; 3-chloro-2,3-diethylbutene-1; 3-chloro-2-methyl-3-phenylbutene-1; 2-iodomethylpropane-1; 2-chloromethyl-4,4-dimethylpentene-1; 2-chloromethyl- 4-chlorobutene-1; and their homologs, analogs, and suitable substitution products, such as:

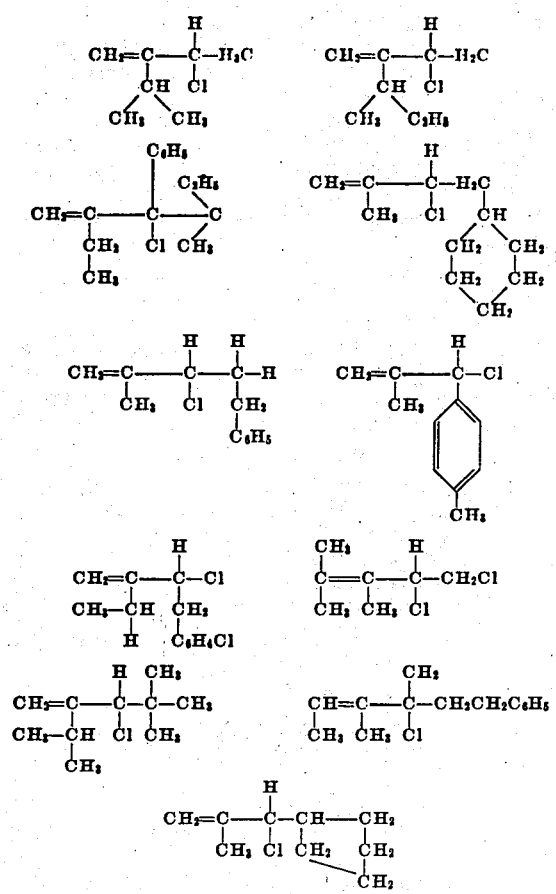

As above described, we prefer to carry out our process in an aqueous solution or dispersion by generating nitrous acid directly in the solution. However, variations in the described procedure may be made without departing from the scope of our invention. For example, a nitrogen oxide such as nitrogen trioxide, which may or may not be admixed with an inert gaseous diluent, may be introduced directly into the olefinic reactant, which may or may not be dissolved or dispersed in an aqueous or non-aqueous solvent. A further modification is the vapor phase reaction between a vaporized olefinic reactant and a nitrogen oxide or mixture of oxides which may or may not be admixed with an inert gaseous diluent. The process of the present invention may be operated batchwise, intermittently, or continuously, as is desired and convenient in any specific application. In the preferred process, or modifications thereof, super or sub-atmospheric pressures may be employed, but we have found that atmospheric pressure gives excellent results in most instances and is the preferred pressure.

As above described, the alkali and alkaline earth metal nitrites are generally suitable for use in the process of our invention. For example, sodium and potassium nitrites give excellent results, as do barium and strontium nitrites. In some instances an insoluble precipitate may be formed, for example, when barium nitrite is used in conjunction with sulfuric acid insoluble barium sulfate is formed. However, this does not interfere with the process of our invention, and may be advantageous where removal of the metallic ion is desired.

The following examples further illustrate preferred embodiments of our invention, which is not to be considered as limited thereby:

*Example I*

To a mixture of 270 grams of methallyl chloride, 392 grams of sulfuric acid, and 1600 grams of water was added dropwise a solution of 520 grams of sodium nitrite in 675 grams of water. The temperature was held to about 40° C. during the nitrite addition, which required about two hours. A blue color soon appeared in the oil layer, which at the end of the reaction contained the nitrosation products, any unconverted methallyl chloride, and a minor amount of by-products. The oil layer was separated and washed with water. The separated oil layer, weighing 380 grams, was mixed with a double quantity of toluene, and the resulting mixture heated to boiling temperature. The color rapidly changed from blue to green or greenish-yellow, with evolution of some gas, probably chiefly nitrous oxide. When gas evolution ceased, the unreacted methallyl chloride and subsequently the toluene were removed by vacuum distillation, the residue turning yellow. The yellow residue, containing the desired product and a minor amount of by-products, was subjected to fractional distillation. The fraction boiling at from 60 to 90° C. at 10 mm. pressure was treated with a strong aqueous solution of lye, and the undissolved constituents separated therefrom by ether extraction. The alkaline solution was acidified, extracted with ether, and 2-chloromethyl-3-nitropropene-1 (nitromethallylchloride), the desired product, separated therefrom. The product was a pale yellow liquid with a boiling point of 62° C. at 4 mm. pressure, a refractive index $n_D^{20}=1.4742$, and a density of 1.234 at 20° C. The yield was about 50% based on the converted methallylchloride; omission of the alkali purification step results in a yield of about 70%.

*Example II*

Example I was repeated at four other temperatures: 0, 10, 25 and 60° C. Analogous results and substantially identical yields were obtained, but as shown in the following table, more methallylchloride reacted at the higher temperatures, but a correspondingly larger residue remained after fractionation.

| Reaction Temperature | Unconverted Methallyl-Chloride | Residue after Fractionation |
|---|---|---|
| ° C. | Grams | Grams |
| 0 | 140 | 15 |
| 10 | 150 | 20 |
| 25 | 100 | 50 |
| [1] 40 | 90 | 60 |
| 60 | 75 | 65 |

[1] From Example I, included for comparison.

*Example III*

In a manner substantially identically to that described for methallyl chloride (Example I), 2-chloromethyl-4,4-dimethyl-pentane-1 may be reacted with nitrous acid, and 1-nitro-2-chloromethyl-4,4-dimethylpentene-2 recovered as the chief product.

*Example IV*

In accordance with the process described in Example I, 2-chloromethyl-4-chlorobutene-1 may be reacted to produce 1-nitro-2-chloromethyl-4-chlorobutene-2 as the chief product.

The invention claimed is:
1. 2-chloromethyl-3-nitropropene-1.
2. The process for the production of 2-chloromethyl-3-nitropropene-1 which comprises reacting, at a temperature of not more than about 100° C., methallylchloride with nitrous acid.
3. The process for the production of 2-chloromethyl-3-nitropropene-1 which comprises reacting, at a temperature of not more than about 100° C., methallylchloride in an aqueous medium with nitrous acid.
4. The process for the production of 2-chloromethyl-3-nitropropene-1 which comprises reacting, at a temperature of not more than about 100° C., methallylchloride in an aqueous medium with nitrous acid which is generated within the aqueous medium.
5. A process for the production of 1-nitro-2-chloromethyl-4,4-dimethylpentene-2 which comprises reacting, at a temperature of not more than about 100° C., 2-chloromethyl-4,4-dimethylpentene-1 with a nitrogen oxide.
6. A process for the production of 1-nitro-2-chloromethyl-4,4-dimethylpentene-2 which comprises reacting, at a temperature of not more than about 100° C., 2-chloromethyl-4,4-dimethylpentene-1 in an aqueous medium with nitrous acid.
7. 1-nitro-2 - chloromethyl - 4,4 - dimethylpentene-2.
8. A process for the production of 1-nitro-2-chloromethyl-4-chlorobutene-2 which comprises reacting, at a temperature of not more than about 100° C., 2-chloromethyl-4-chlorobutene-1 with a nitrogen oxide.
9. A process for the production of 1-nitro-2-chloromethyl-4-chlorobutene-2 which comprises reacting, at a temperature of not more than about 100° C., 2-chloromethyl-4-chlorobutene-1 in an aqueous medium with nitrous acid.
10. 1-nitro-2-chloromethyl-4-chlorobutene-2.
11. A 3-chloro-2-alkylidene-1-nitroalkane containing from 4 to 16 carbon atoms.
12. A process for the production of 3-chloro-2-alkylidene-1-nitroalkanes which comprises reacting, at a temperature of not more than about 100° C., an alkenyl chloride containing from 4 to 16 carbon atoms and containing the structural grouping

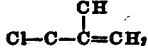

with nitrous acid.
13. A mono-olefinic mononitrohalohydrocarbon having from 4 to 16 carbon atoms to the molecule and containing the structural grouping

14. A process for the production of mono-olefinic-mononitrohalohydrocarbons which comprises reacting at a temperature of not more than about 100° C. a monoolefinic halohydrocarbon having from 4 to 16 carbon atoms to the molecule and which contains the structural grouping

with a nitrogen oxide.

EDUARD CORNELIS KOOIJMAN.
JOHAN OVERHOFF.

REFERENCES CITED

The following references are of record in the file of this patent:
Science News Letter, March 22, 1947, page 188.